(12) United States Patent
Gonze et al.

(10) Patent No.: US 8,968,666 B2
(45) Date of Patent: Mar. 3, 2015

(54) ELECTRICALLY HEATED CATALYST WITH WASTE HEAT RECOVERY

(75) Inventors: Eugene V. Gonze, Pinckney, MI (US); Stuart R. Smith, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 254 days.

(21) Appl. No.: 13/613,447

(22) Filed: Sep. 13, 2012

(65) Prior Publication Data

US 2014/0072477 A1 Mar. 13, 2014

(51) Int. Cl.
*B01D 50/00* (2006.01)

(52) U.S. Cl.
USPC ............................................. 422/168

(58) Field of Classification Search
CPC ...... F01N 2260/024; F01N 3/043; F01N 5/02
USPC .......................................... 422/174, 177, 180
See application file for complete search history.

(56) References Cited

U.S. PATENT DOCUMENTS

| 6,235,254 B1 * | 5/2001 | Murphy et al. ................ 423/212 |
| 2009/0038302 A1 * | 2/2009 | Yamada et al. ................ 60/320 |
| 2011/0131961 A1 * | 6/2011 | Lee et al. ........................ 60/320 |

FOREIGN PATENT DOCUMENTS

| DE | 3920159 A1 * | 1/1991 |
| JP | 2012092820 A * | 5/2012 |

* cited by examiner

*Primary Examiner* — Tom Duong (57) ABSTRACT

A catalytic converter includes an inlet end, an outlet end and a catalyst body. The inlet end is configured to receive an exhaust gas from an engine. An outlet end is configured to output the exhaust gas. A catalyst body includes partitioning members disposed between the inlet end and the outlet end. The catalyst body includes exhaust channels and fluid channels. The exhaust channels are configured to guide the exhaust gas from the inlet end to the outlet end. The fluid channels are configured to receive a fluid from and return the fluid to a waste heat recovery circuit. Each of the exhaust channels and each of the fluid channels includes a respective ones of the partitioning members.

20 Claims, 8 Drawing Sheets

ELECTRICALLY HEATED CATALYST WITH WASTE HEAT RECOVERY

FIELD

The present disclosure relates to waste heat recovery systems, and more specifically to waste heat recovery systems as applied to exhaust systems of a vehicle.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A waste heat recovery system may be applied to an exhaust system of a vehicle to recover energy that would be otherwise emitted from the exhaust system. The waste heat recovery system may convert thermal energy obtained from the exhaust system to electrical energy, which may then be used operate electrical components and/or motor(s) of the vehicle.

A waste heat recovery system may include, for example, a heat exchanger or coil in which a coolant passes. The coil may be located within and receive thermal energy from an exhaust system. The coolant is then passed through an expander, where thermal energy within the coolant may be converted to mechanical energy. The coolant is then pumped through and further cooled by a condenser prior to again being cycled through the heat exchanger.

In addition to having the heat exchanger, the exhaust system may also include a catalytic converter. The catalytic converter may be located, for example, upstream from the heat exchanger and be used to reduce emissions of an internal combustion engine (ICE). For example, a three-way catalytic converter reduces nitrogen oxide, carbon monoxide and hydrocarbons within an exhaust system. The three-way catalytic converter converts nitrogen oxide to nitrogen and oxygen, converts carbon monoxide to carbon dioxide, and oxidizes unburnt hydrocarbons (HC) to produce carbon dioxide and water.

An average catalyst light-off temperature at which a catalytic converter typically begins to function is approximately 200-350° C. As a result, a catalytic converter does not function or provides minimal emission reduction during a warm up period that occurs upon a cold startup of the ICE. Exhaust system temperatures are less than the catalyst light-off temperature during an engine cold start. During the warm up period, HC emissions may not be effectively processed by the catalytic converter.

SUMMARY

A catalytic converter is provided and includes an inlet end, an outlet end and a catalyst body. The inlet end is configured to receive an exhaust gas from an engine. An outlet end is configured to output the exhaust gas. A catalyst body includes partitioning members disposed between the inlet end and the outlet end. The catalyst body includes exhaust channels and fluid channels. The exhaust channels are configured to guide the exhaust gas from the inlet end to the outlet end. The fluid channels are configured to receive a fluid from and return the fluid to a waste heat recovery circuit. Each of the exhaust channels and each of the fluid channels includes respective ones of the partitioning members.

In other features, a catalytic converter is provided and includes an inlet end, an outlet end, a catalyst body and electrodes. The inlet end is configured to receive an exhaust gas from an engine. The outlet end is configured to output the exhaust gas. The catalyst body is disposed between the inlet end and the outlet end. The catalyst body includes exhaust channels and fluid channels. The exhaust channels are configured to guide the exhaust gas from the inlet end to the outlet end. The fluid channels are configured to receive a fluid from and return the fluid to a waste heat recovery circuit. The electrodes are connected to the catalyst body and pass current through the catalyst body.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
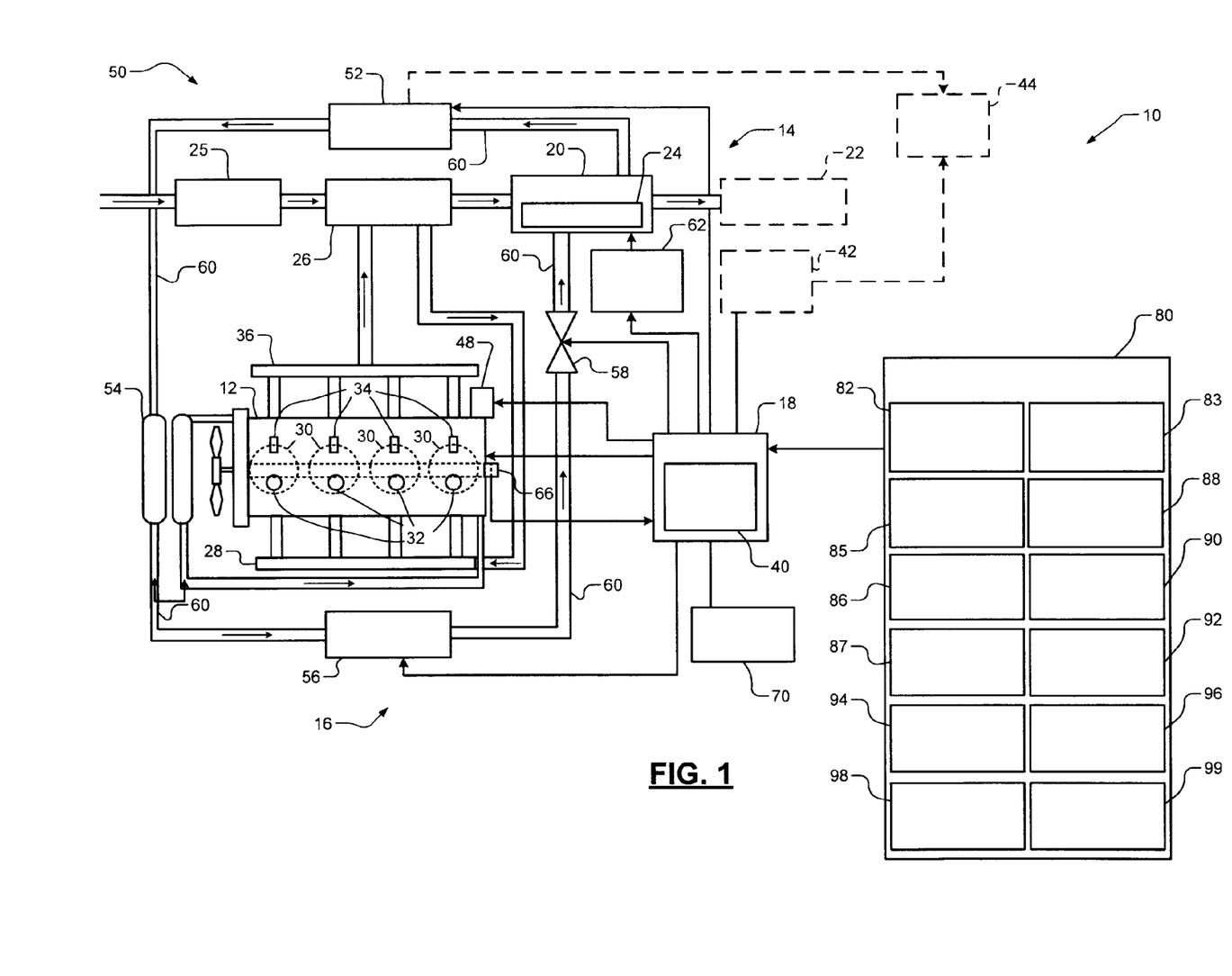
FIG. 1 is a functional block diagram of an engine system incorporating a waste heat recovery system in accordance with the preset disclosure.

In FIG. 1, an engine system 10 is shown. The engine system 10 includes an internal combustion engine (ICE) 12, an exhaust system 14, a waste heat recovery (WHR) system 16, and an engine control module (ECM) 18. The exhaust system 14 includes a WHR catalytic converter (CC) 20 and may include a secondary CC 22. The WHR CC 20 may be, for example, a three-way CC and includes a catalyst body 24 configured for WHR. If the secondary CC 22 is included, the WHR CC 20 may be referred to as a close coupled catalyst and the secondary CC 22 may be referred to as an underfloor catalyst. The WHR CC 20 may be connected at various locations along the exhaust system 14.

Although the engine system 10 is shown as a gasoline engine system having a spark ignition engine (the ICE 12), the engine system 10 is provided as an example. The WHR system 16 may be implemented on various other engine systems including diesel engine systems. The engine system 10 may be an alcohol-based engine system, such as a methanol, ethanol, and/or E85 based engine system.

The ICE 12 combusts an air and fuel mixture to produce drive torque. Air enters the ICE 12 by passing through an air filter 25. Air passes through the air filter 25 and may be drawn into a turbocharger 26. The 26 when included compresses the fresh air. The greater the compression, the greater the output of the ICE 12. The compressed air may pass through an air cooler (not shown) before entering an intake manifold 28.

Air within the intake manifold 28 is distributed into cylinders 30. Fuel is injected into the cylinders 30 by fuel injectors 32. Spark plugs 34 ignite air/fuel mixtures in the cylinders 30. Combustion of the air/fuel mixtures creates exhaust. The exhaust exits the cylinders 30 into the exhaust system 14.

The exhaust system 14 includes the WHR CC 20, the ECM 18, an exhaust manifold 36, and may include an air pump (not shown). As an example, the catalyst body of the WHR CC 20 and the secondary CC 22 may each include a three-way catalyst (TWC). The TWCs may reduce nitrogen oxides NOx, oxidize carbon monoxide (CO) and oxidize unburnt hydrocarbons (HC) and volatile organic compounds. The TWCs oxidize the exhaust based on a post combustion air/fuel ratio. The amount of oxidation increases the temperature of the exhaust. The ECM 18 includes a thermal control module 40, which controls temperatures of the exhaust system 14 and operation of the WHR system 16.

Optionally, an EGR valve (not shown) re-circulates a portion of the exhaust back into the intake manifold 28. The remainder of the exhaust is directed into the turbocharger 26 to drive a turbine. The turbine facilitates the compression of the fresh air received from the air filter 25. Exhaust flows from the turbocharger 26 to the WHR CC 20.

The engine system 10 may be a hybrid electric vehicle system and include a hybrid control module (HCM) 42 and one or more electric motor(s) 44. The HCM 42 may be part of the ECM 18 or may be a stand-alone control module, as shown. The HCM 42 controls operation of the electric motor(s) 44. The electric motor(s) 44 may supplement and/or replace power output of the ICE 12. The electric motor(s) 44 may be used to adjust speed of the ICE 12 (i.e. rotating speed of a crankshaft 46 of the ICE 12). The electric motor(s) 44 may be connected to the ICE 12 via a belt/pulley system, via a transmission, one or more clutches, and/or via other mechanical connecting devices. The ECM 18 and/or HCM 42 may control operation of the electric motor(s) 44 and/or a starter 48 to rotate the crankshaft 46.

The WHR system 16 includes a WHR circuit 50 that includes the WHR CC 20, an expander 52, a condenser 54, a WHR pump 56, and a valve 58. Fluid lines 60 (e.g., hoses) are connected between the WHR CC 20, the expander 52, the condenser 54, the WHR pump 56, and the valve 58. A fluid is circulated in the WHR circuit 50 via the WHR pump 56, which directs the fluid from the condenser 54 through the valve 58 and to the WHR CC 20, the fluid is then directed to the expander 52 and back to the condenser 54. The fluid may be a coolant (e.g., hydrocarbon refrigerant). The fluid may include, for example, Butane, Pentane and/or other suitable fluid. The fluid may not be a conductive fluid, such as water ($H_2O$) or ethanol to prevent electrical current passing from the WHR CC 20 to other components of the engine system 10 and/or a corresponding vehicle. The fluid from the expander 52 may be in a gaseous state when received by the condenser 54 and be in a liquid state when exiting the condenser 54.

The fluid is used to transfer thermal energy from the WHR CC 20 to the expander 52, where the thermal energy may be converted to mechanical energy and then later converted to electrical energy. The mechanical energy from the expander 52 may be supplied to, for example, the electric motor(s) 44. The electrical energy may be supplied to a valvetrain of the ICE 12, a power supply, and/or to other electrical components in the engine system 10 and/or in the vehicle. The expander 52 may include a motor, which converts the thermal energy of a pressurized fluid to a mechanical output torque $\omega$. The output torque $\omega$ may be provided to, for example, an engine, a generator, or a starter.

The ECM 18 and/or the thermal control module 40 may control operation of the WHR system 16 via the WHR pump 56 and the valve 58. Fluid may be permitted to circulate and/or prevented from circulating in the WHR circuit 50 by powering ON and OFF the WHR pump 56 and/or by controlling an OPEN or CLOSED state of the valve 58. The rate and/or pressure at which the fluid circulates through the WHR circuit 50 may also be controlled by adjusting speed of the WHR pump 56 and/or opening of the valve 58.

The WHR CC 20 includes the catalyst body 24, which may be electrically-heated in certain conditions, as described below. Current may be supplied to the WHR CC 20 from a power source 62. The supply of current to the WHR CC 20 is controlled by the ECM 18 and/or thermal control module 40. The catalyst body 24 is configured to receive the exhaust gas from the exhaust system 14 and to receive the fluid passing through the WHR circuit 50. This is described further below.

The ECM 18, the thermal control module 40, and/or the HCM 42 control the ICE 12, the WHR system 16, the electric motor(s) 44, the starter 48 and current supplied to the catalyst body 24 based on sensor information. The sensor information may be obtained directly via sensors and/or indirectly via algorithms and tables stored in memory 70. Some example sensors 80 for determining exhaust flow levels, exhaust temperature levels, exhaust pressure levels, catalyst temperatures, oxygen levels, intake air flow rates, intake air pressure, intake air temperature, vehicle speed, engine speed, EGR, etc. are shown. Exhaust flow sensors 82, exhaust temperature sensors 83, exhaust pressure sensors 85, catalyst temperature sensors 86, oxygen sensors 88, an EGR sensor 90, an intake air flow sensor 92, an intake air pressure sensor 94, an intake air temperature sensor 96, vehicle speed sensor 98 and an engine speed sensor 99 are shown. The thermal control module 40 may control operation of the WHR pump 56, the valve 58, the power source 62, the expander 52 and/or other components of the WHR system 16 based on the information from the sensors 80.

Figure 2:
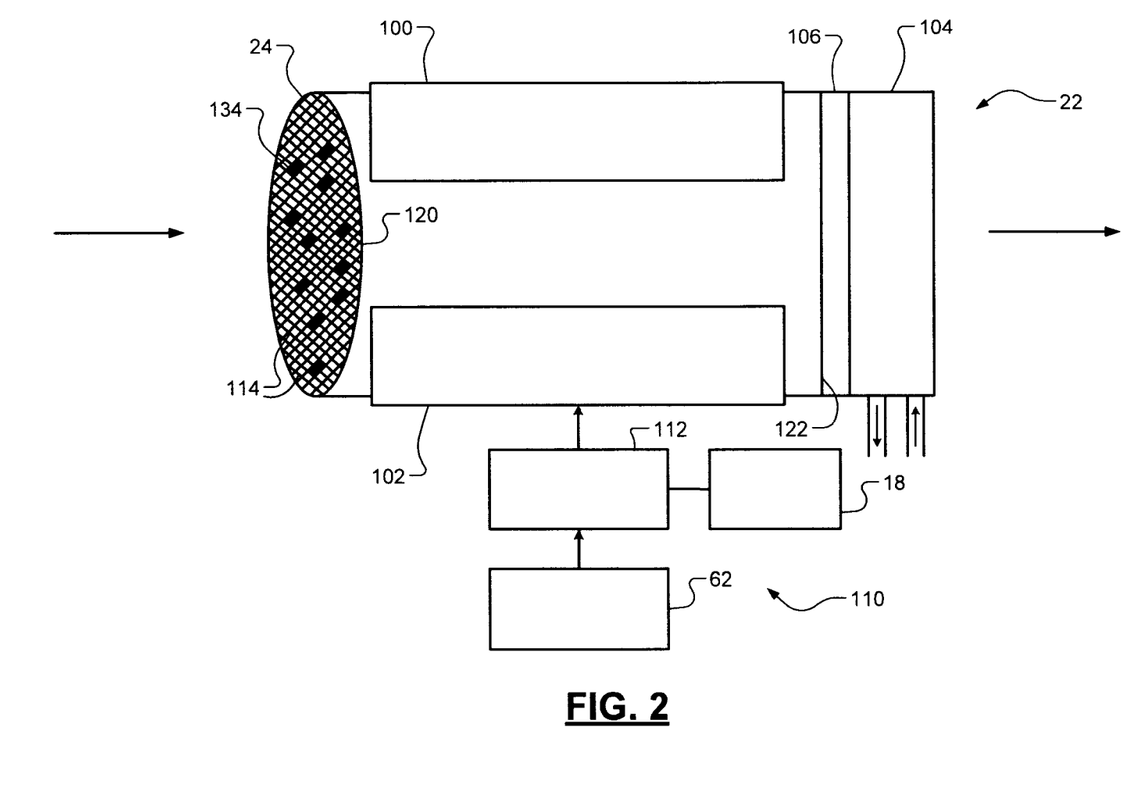
FIG. 2 is a functional block diagram illustrating a side view of an electrically heated catalytic converter in accordance with the preset disclosure.
Figure 3:
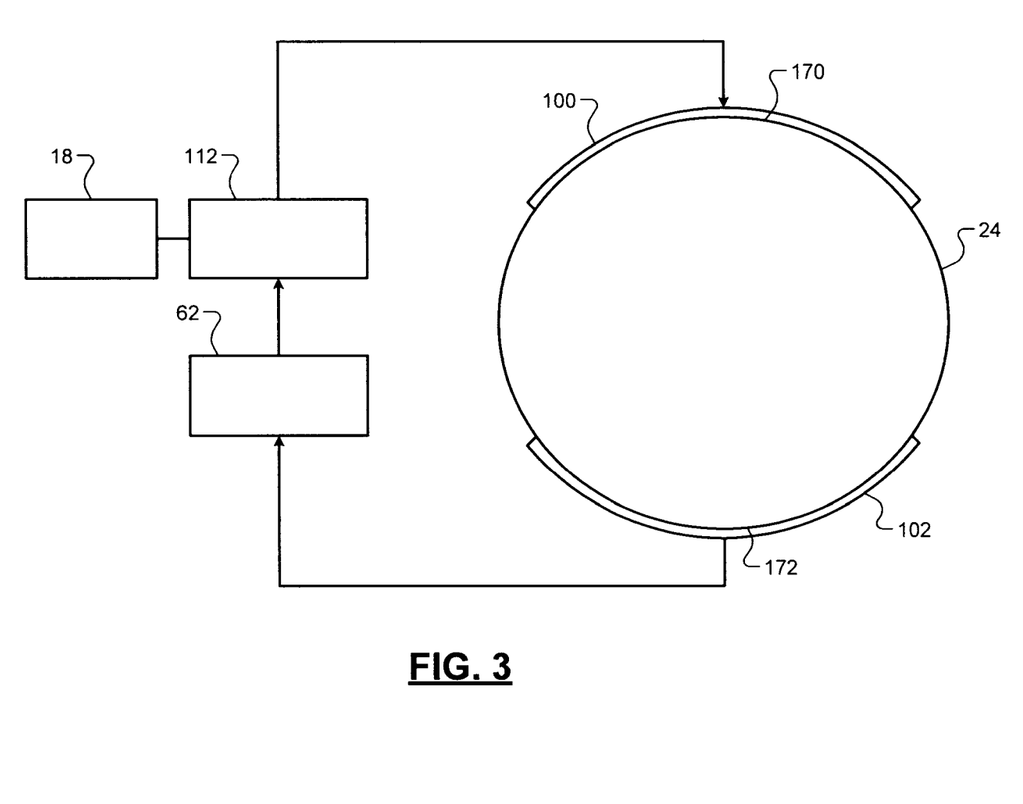
FIG. 3 is a functional block diagram illustrating an end view of the electrically heated catalytic converter of FIG. 2.
Figure 4:
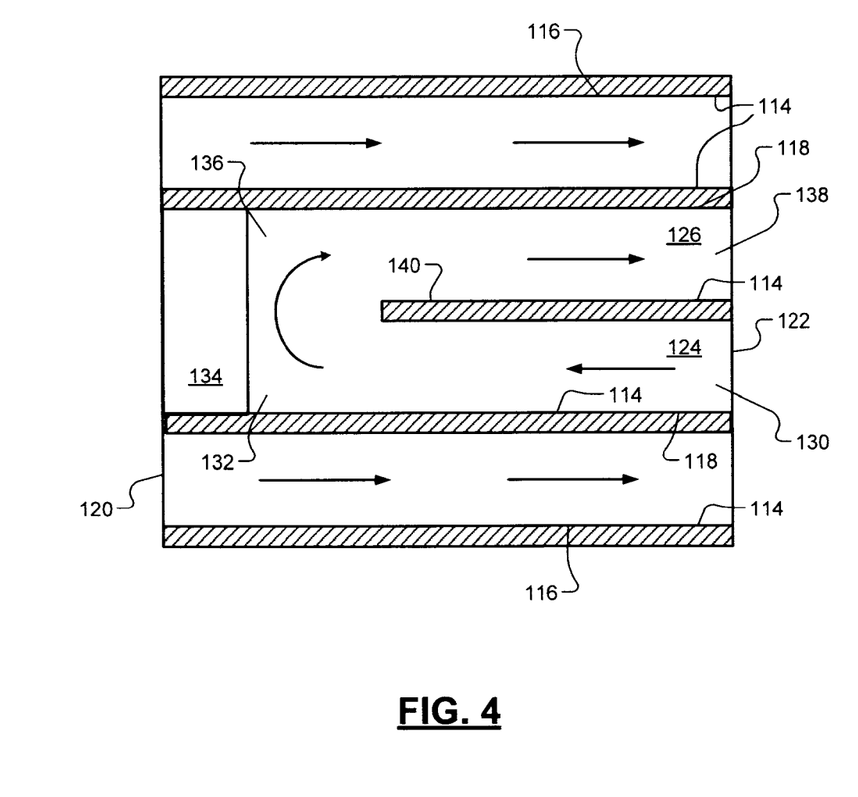
FIG. 4 is a cross-sectional view of a portion of a catalyst body of the electrically heated catalytic converter of FIG. 2.

In FIGS. 2-4, side and end views of the WHR CC 20 and a cross-sectional view of the catalyst body 24 are shown. The WHR CC 20 includes the catalyst body 24 (or substrate 24), electrodes 100, 102, a WHR manifold 104, and may include an insulator 106. The substrate 24 is formed of a thermally and electrically conductive material, such as siliconized-silicon carbide (Si—SiC), a ceramic composite material, and/or other suitable material(s). This allows thermal energy to pass from the exhaust gas and/or the substrate 24 to the fluid and also permits electrical heating of the substrate 24. The substrate 24 may have a resistance and/or impedance that is less than a first predetermined resistance and/or impedance and greater than a second predetermined resistance and/or impedance. The first predetermined resistance and/or impedance is set to allow a predetermined amount of current to flow through and heat the substrate 24. The first predetermined resistance and/or impedance may be set to direct a high or predetermined percentage of the current supplied to the first electrode 100 to pass through the substrate 24 and the fluid and to the second electrode 102. The second predetermined resistance and/or impedance is set to prevent a short between the electrodes 100, 102 and/or to limit the amount of current flowing through the substrate 24.

Heating of the substrate 24 heats the exhaust gas and the fluid passing through the substrate 24. The electrodes 100, 102 are connected to a catalyst heating system 110, which may include the ECM 18, the power source 62 and a switch

112. The power source 62 may be a high-voltage power source, for example, having an output voltage of greater than or equal to 100V. The substrate 24 is electrically heated via the electrodes 100, 102. Current is supplied from the power source 62 via the switch 112 to the first electrode 100. The current passes through the substrate 24 to the second electrode 102 and heats the substrate 24 to a temperature greater than or equal to a light-off temperature.

The substrate 24 may include, for example, a TWC deposited on the substrate 24. The TWC may include catalyst metals, such as platinum, rhodium, palladium, and/or other catalyst metals. The catalyst metals may be sparsely located across surface areas of the substrate 24 and may be, for example, embedded into an alumina washcoat of the substrate 24. The washcoat may be non-conductive and/or have a high-resistance and/or high-impedance as to minimize electrical current flow in the washcoat.

The substrate 24 may have a honeycomb configuration with partitioning members 114 that form walls of exhaust channels 116 and fluid channels 118 included in the substrate 24. The exhaust channels 116 and fluid channels 118 extend parallel to each other between an inlet end 120 and an outlet end 122 of the substrate 24. The exhaust channels 116 allow the exhaust gas from the ICE 12 to pass from the inlet end 120 to the outlet end 122.

The fluid channels 118 may include receive and return channel pairs. Each of the channel pairs includes a receive channel 124 and a return channel 126. The receive channel 124 and the return channel 126 may be connected to each other and/or be formed together as a single channel. The channel pairs extend along the substrate 124 from the inlet end 120 to the outlet end 122 to efficiently absorb thermal energy from the substrate 24.

Each of the receive channels has a first end 130 and a second end 132. The first end 130 may be at the outlet end 122 of the substrate 24 and receive the fluid from the WHR manifold 104. The second end 132 may be at the inlet end 120 of the substrate 24 and may be blocked from receiving the exhaust gas by an end plug 134.

The return channel 126 may include a first end 136 and a second end 138. The first end 136 may be at the inlet end 120 of the substrate 24 and may also be blocked from receiving the exhaust gas via the end plug 134. The end plug 134 may be inserted into the receive channel 124 and the return channel 126 at the inlet end 120 of the substrate 24. A single end plug may be included for each channel pair. The fluid flows in the return channel 126 in an opposite direction than in the receive channel 124.

The end plugs are on an opposite end of the substrate 24 as the WHR manifold 104. Although the end plugs are shown at the inlet end 120 and the WHR manifold 104 is shown at the outlet end 122, the end plugs may be at the outlet end 122 and the WHR manifold 104 may be at the inlet end 120. The second end 138 may be at the outlet end 122 of the substrate 24 and return the fluid received by the receive channel 124 back to the WHR manifold 104.

Each member (e.g., the member 140) of the substrate 124 that is located between a receive channel and a return channel of the channel pairs may not extend fully to the inlet end 120. These members may be shorter in length than other members of the substrate 24 that extend fully from the inlet end 120 to the outlet end 122. This allows the fluid to pass from the receive channel to the return channel across a respective end plug (e.g., the end plug 134).

Figure 5:
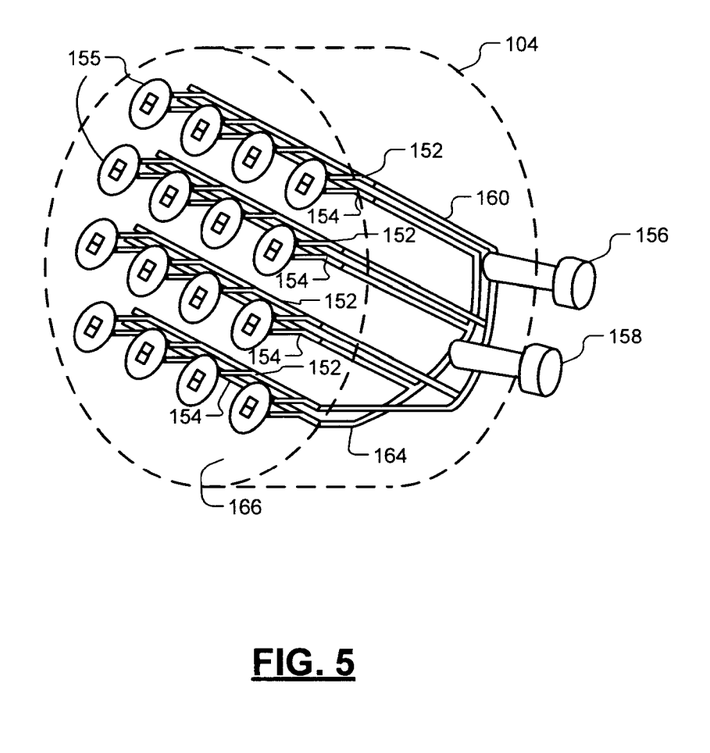
FIG. 5 is a perspective view of a manifold in accordance with the preset disclosure.

Referring now also to FIG. 5, the WHR manifold 104 is shown. The WHR manifold 104 may include exhaust channels (not shown), fluid (receive and return) channels 152, 154, channel couplers 155, fluid connectors 156, 158, etc. Although the exhaust channels of the WHR manifold 104 are not shown in FIG. 5, the exhaust channels are similar to the exhaust channels 116 of the substrate 24. The WHR manifold 104 receives the fluid from the WHR circuit 150 and/or valve 58 of FIG. 1 via the first fluid (or receive) connector 156 and directs the fluid from the first fluid connector 156 to the receive channels 152. The first fluid connector 156 is connected to the WHR circuit 150. The receive channels 152 then direct the fluid to the receive channels (e.g., the receive channel 124) of the substrate 24. The receive channels 152 may include (i) an intake manifold 160 with an input that is connected to the first fluid connector 156 and (ii) multiple outputs connected to respective ones of the receive channels 152.

The fluid then passes from the receive channels of the substrate 24 through the return channels (e.g., the return channel 126) of the substrate 24 and into the return channels 154. The fluid is directed from the return channels 154 to the second fluid connector 158 (return connector) after which the fluid is directed to the expander 52 of FIG. 1. The return channels 154 may include (i) an output manifold 164 that includes multiple inputs connected to respective ones of the return channels 154 and (ii) an output connected to the second fluid connector 158. The second fluid connector 158 is connected to the WHR circuit 150.

The channel couplers 155 may be located between the channels of the WHR manifold 104 and the channels (e.g., channels 116, 118) of the substrate 24 depending on the configurations of the substrate 24 and the WHR manifold 104. The channel couplers 155 may be non-conductive and recessed within the WHR manifold 104 and/or the substrate 24. The channel couplers 155 may prevent electrical current from passing between (i) the substrate 24 and/or channels of the substrate 24 and (ii) the channels 152, 154. In one implementation, the channel couplers 155 are not included and the channels of the substrate 24 abut the channels 152, 154. In this implementation the channels of the substrate 24 may directly receive the fluid from and directly return the fluid to the channels of the WHR manifold 104. In another implementation, the channel couplers are included to isolate the WHR manifold 104 from the conductive materials of the substrate 24.

The WHR manifold 104 may include a manifold body 166 that includes the exhaust channels (not shown in FIG. 5) and the fluid channels 152, 154. The manifold body 166 may have a honeycomb structure similar to that of the substrate 24. This allows the exhaust and fluid channels of the WHR manifold 104 to be aligned with respective channels of the substrate 24. In one implementation, the manifold body 166 is formed of a non-conductive material(s), such as cordierite, to prevent electrical current passing from the substrate 24 to the WHR manifold 104 and/or other components of the engine system 10. A TWC may be deposited on the manifold body 166 or the manifold body 166 may perform as a pass through device (i.e. the exhaust gas is not oxidized, treated, and/or chemically changed in the manifold body 166). In one implementation, the manifold body 166 is formed of a conductive material, such as Si—SiC, and is separated from the substrate 24 via the insulator 106 or other suitable current insulating device(s).

The insulator 106 may be included between the substrate 24 and the WHR manifold 104 to prevent passage of current from the electrodes 100, 102 to the WHR manifold 104 via the substrate 24 and/or channels of the substrate 24. The insulator 106 may be included to electrically isolate the WHR manifold 104, channels 152, 154, and/or connectors 156, 158 from the substrate 24. Inclusion of the insulator 106 depends on the configurations of the substrate 24 and the WHR manifold 104. For example, if the substrate 24 and the WHR manifold 104 are formed of conductive materials, the insulator 106 may be included. If the manifold body 166 is formed of non-conductive materials, the insulator 106 may not be included.

The insulator 106 may have a honeycomb structure and include channels extending between the respective channels of the substrate 24 and respective channels of the WHR manifold 104. The insulator 106 is formed of non-conductive material(s), which may include cordierite.

The substrate 24, the manifold body 166, the insulator 106, and/or channel couplers 155 may have similar expansion and contraction properties to exhibit similar changes during heating and cooling transitions. This allows the channels of each of the substrate 24, the manifold body 166, and the insulator 106 to remain in alignment with each other. Alignment between (i) the channels of the substrate 24, the manifold body 166, and the insulator 106 and (ii) the channel couplers 155 is also maintained. By having similar expansion and contraction properties, cracking is prevented in the substrate 24, the manifold body 166, the insulator 106, and/or channel couplers 155. The substrate 24, the manifold body 166, the insulator 106, and/or the channel couplers 155 may be adhered to each other using an adhesive. The insulator 106 and/or adhesive may be formed of a flexible material to: maintain alignment of the channels of the substrate 24, the manifold body 166, the insulator 106, and/or channel couplers 155; prevent cracking; and maintain integrity and continuity of the fluid channels from the inlet end 120 to the connectors 156, 158.

As another technique to prevent current from passing from the electrodes 100, 102 through the substrate 24 and the WHR manifold 104 to other components of the WHR circuit 150, the connectors 156, 158 may be non-conductive and/or include insulators and/or current isolators. This electrically separates the catalyst heating system 110 from components of the WHR circuit 150 and/or other components of the engine system 10 and/or vehicle.

By using the substrate 24 of the WHR CC 20 to recover thermal energy from the exhaust system 14, a high percentage of energy in the exhaust system 14 is recoverable. Forming the substrate 24 of Si—SiC and/or other similar material(s) provides an efficient heat source for the transfer of thermal energy.

Figure 6:
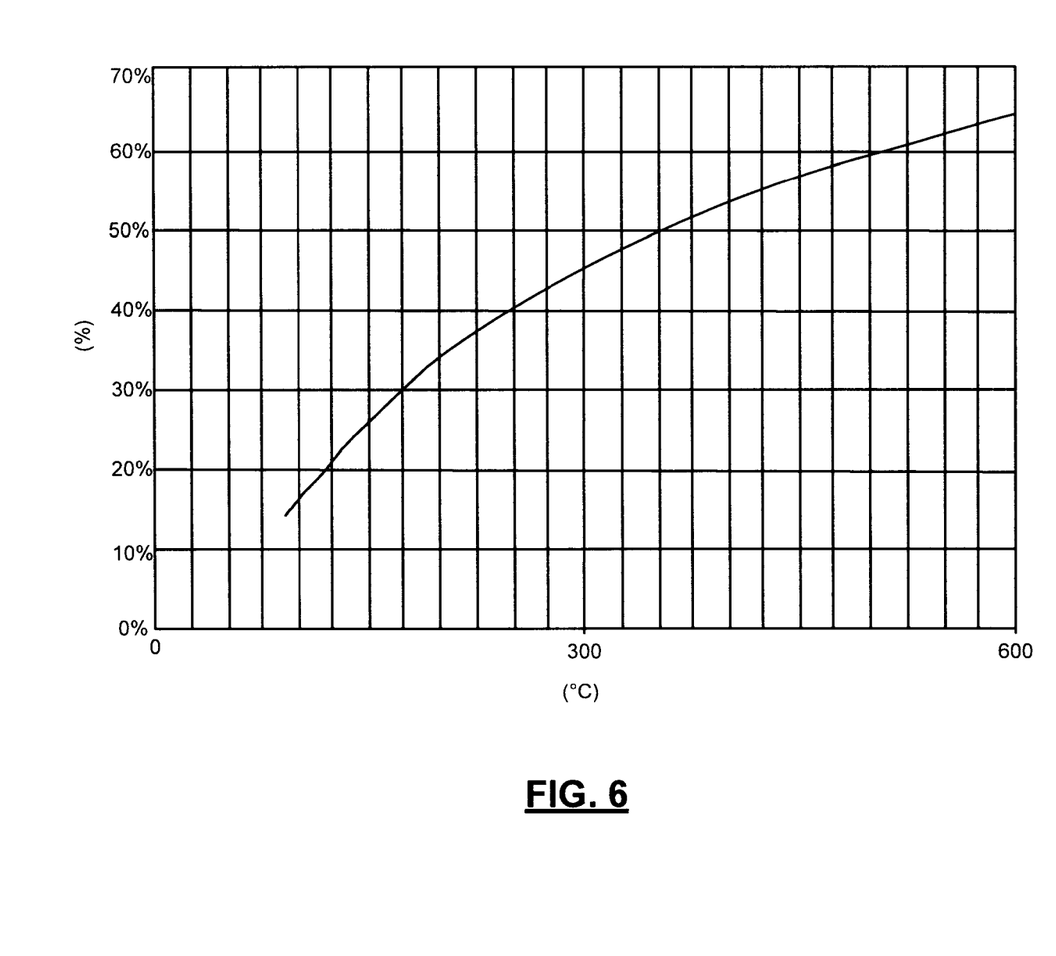
FIG. 6 is a recovery efficiency versus temperature plot.

In FIG. 6, a recovery efficiency versus temperature plot is shown. The higher the temperature of the heat source, the higher the grade of the heat source and the more efficient the waste heat recovery system. Higher substrate temperatures yield higher WHR efficiencies. The maximum efficiency $Eff_{max}$ of a heat source may be determined, for example, using equation 1, where $T_{amb}$ is ambient temperature and $T_s$ is source temperature or temperature of the substrate 24.

$$Eff_{max} = 1 - \frac{T_{amb}}{T_s} \quad (1)$$

Waste heat recovery may be measured as an amount of energy Q recovered using, for example, equation 2, where m is mass of the substrate 24 including particulate, exhaust and/or fluid in the substrate 24, c the specific heat of the substrate 24, and ΔT is the change in temperature of the substrate 24 over a period in which the energy Q is recovered. The specific heat c of the substrate 24 may be, for example, 880 Joules/Kilogram (kg)·1° Kelvin (K) (or J/kgK).

$$Q = m \cdot c \cdot \Delta T \quad (2)$$

As an example, as low as 10% of thermal energy in a catalyst body may be converted back to electrical energy at low temperatures (temperatures less than 100° C.). As high as 80% of thermal energy in a catalyst body may be converted back to electrical energy at high temperatures (temperatures greater than 600° C.).

By incorporating WHR channels (the channels of the substrate 24) in the WHR CC 20, improved exhaust packaging is provided in comparison to traditional exhaust systems on which WHR techniques have been applied. A separate heat exchanger, for example, downstream of a TWC is not needed.

Referring again to FIGS. 2 and 3, the catalyst heating system 110 assists light-off of the catalyst on the substrate 24 during, for example, cold starts. Since the substrate 24 includes fluid channels and corresponding fluid flowing therein, mass of the substrate 24 is increased over a catalyst body without fluid channels. The catalyst heating system 110 accounts for the increased mass and quickly increases the temperature of the substrate 24 and the catalyst up to the light-off temperature by passing an electrical current between the electrodes 100, 102 and through the substrate 24 and the fluid in the substrate 24.

The electrodes 100, 102 may be connected to opposite exterior sides 170, 172 of the substrate 24 and may be shaped similar to the substrate 24 to extend over a predetermined exterior surface area of the substrate 24. Although the electrodes 100, 102 are shown as being exterior to the substrate 24, the electrodes 100, 102 may be mounted within the substrate 24. The electrodes 100, 102 may each have a cross-sectional area that is semi-circular in shape, as shown. By electrically heating the substrate 24, the increased mass of the substrate 24 is overcome and emissions are minimized. The catalyst heating system 110 may be used to provide an exhaust system that satisfies partial zero emissions vehicle (PZEV) requirements. A PZEV has zero evaporative emissions.

Figure 7:
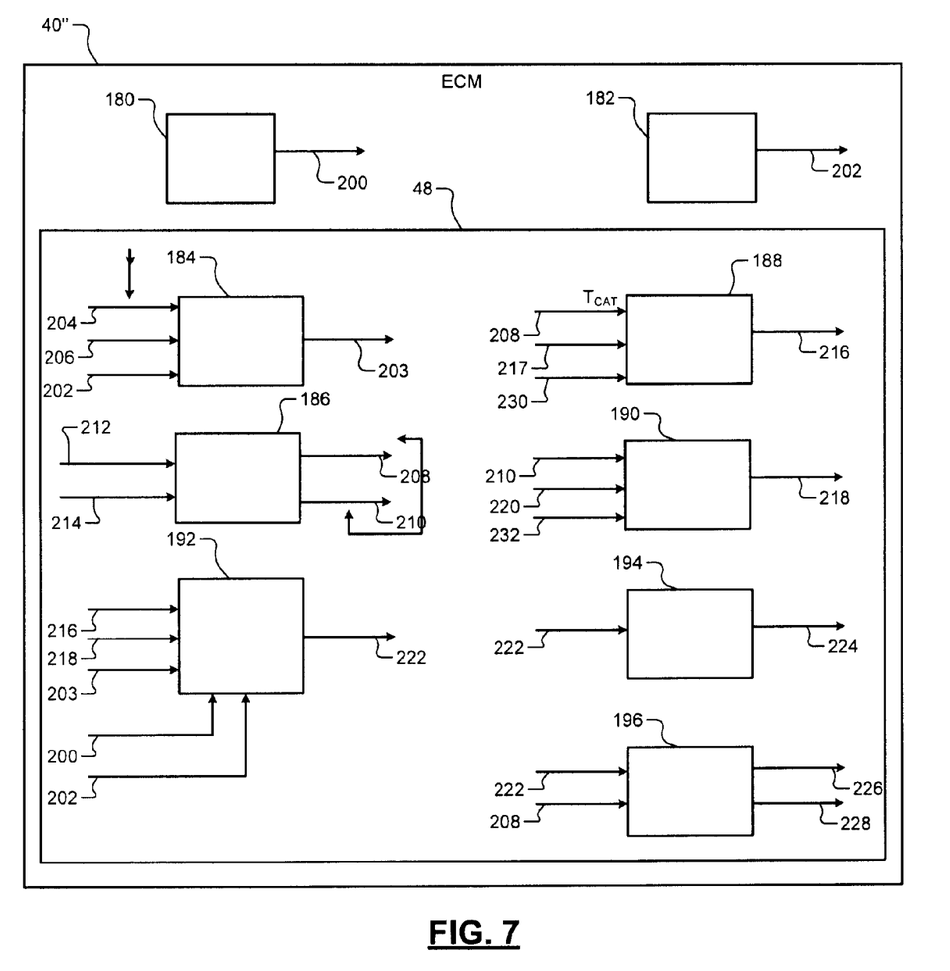
FIG. 7 is a functional block diagram of an engine control module incorporating a thermal control module in accordance with the present disclosure.

Referring now also to FIG. 7, the ECM 18 is shown. The ECM 18 includes the thermal control module 40 and may also include a vehicle speed module 180 and an engine speed module 182. The vehicle speed module 180 determines speed of a vehicle based on information from, for example, the vehicle speed sensor 98 and generates a vehicle speed signal $S_{VEH}$ (200). The engine speed module 182 determines speed of the ICE 12 based on information from, for example, the engine speed sensor 99 and generates an engine speed signal $S_{ENG}$ (202).

The thermal control module 40 includes an engine monitoring module 184, a catalyst monitoring module 186, a first comparison module 188, a second comparison module 190, a mode selection module 192, a temperature module 194, and a WHR module 196. The thermal control module 40 operates in electrical heating and WHR modes. During the electrical heating mode, current is supplied to the electrodes 100, 102 and flow of the fluid in the WHR circuit 150 is restricted and/or prevented. During the WHR mode, the fluid is permitted to circulate through the WHR circuit 150. This flow may be unrestricted and/or increased over the flow of the fluid during the electrical heating mode.

Figure 8:
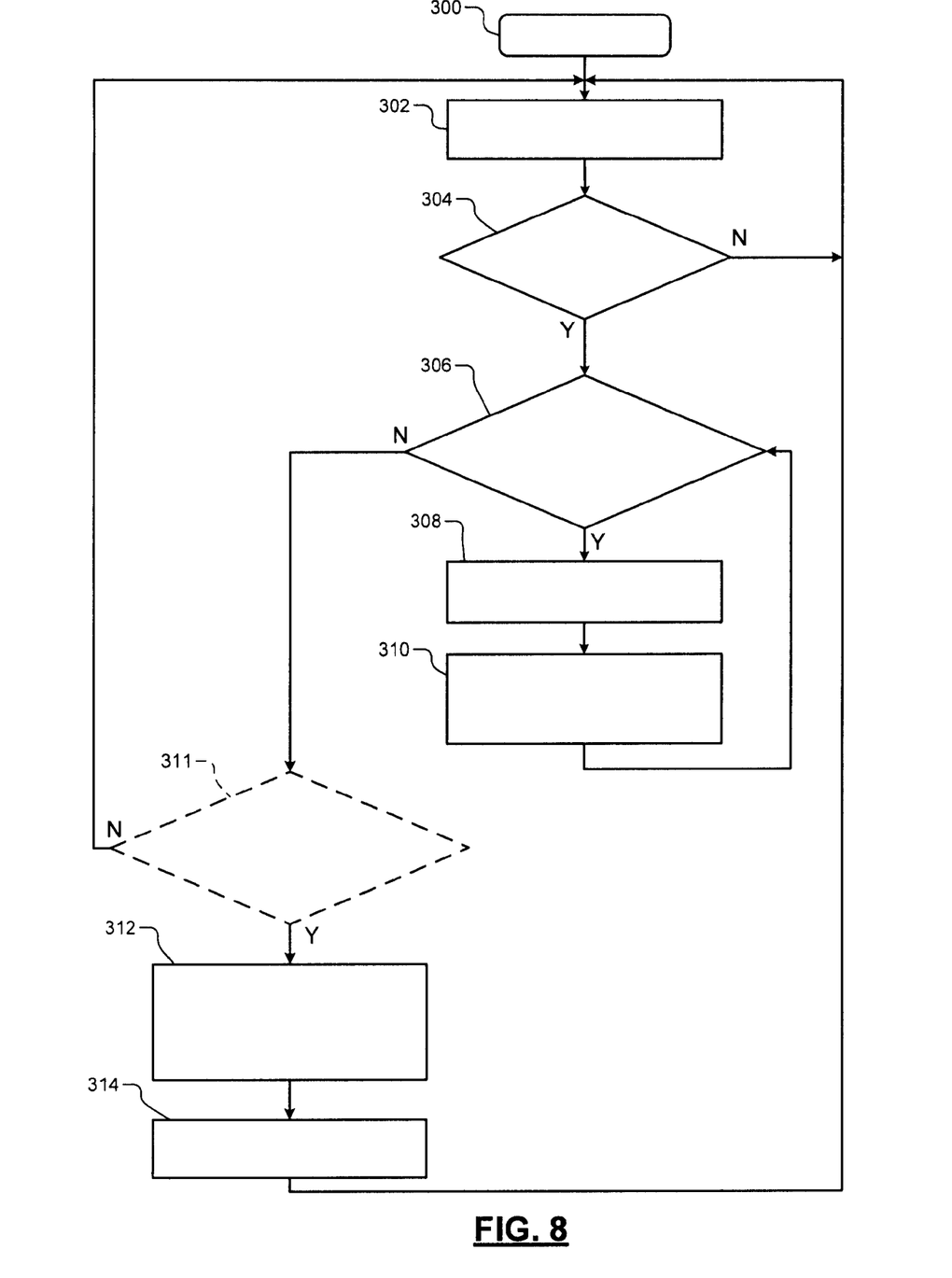
FIG. 8 illustrates a method of operating a waste heat recovery system in accordance with the present disclosure.

The WHR system 16 of FIG. 1 may be operated using numerous methods, an example method is provided by the method of FIG. 8. In FIG. 8, a method of operating the WHR system 16 is shown. Although the following tasks are primarily described with respect to the implementations of FIGS. 1-5 and 7, the tasks may be easily modified to apply to other implementations of the present disclosure. The tasks may be iteratively performed. The method may begin at 300.

At 302, sensor signals are generated. The sensor signals may include exhaust flow signals, exhaust temperature signals, exhaust pressure signals, catalyst temperature signals, an oxygen signal, an intake air flow signal, an intake air pressure signal, an intake air temperature signal, a vehicle speed signal, an engine speed signal, an EGR signal, etc., which may be generated by the above-described sensors 80 and 104-110 of FIG. 1.

At 304, the thermal control module 40 and/or the engine monitoring module 184 determines states of the ICE 12. The engine monitoring module 184 may generate an engine monitoring signal Engine (203) based on the engine speed signal $S_{ENG}$, a fuel supply signal FUEL (204) and/or an ignition enable signal SPARK (206). The engine monitoring signal Engine indicates state of the ICE 12 including whether the engine is ON or OFF, whether fuel and/or spark are enabled, and/or speed of the ICE 12. The thermal control module 40 may proceed to 206 when the engine is ON.

At 306, the thermal control module 40 determines whether temperature $T_{CAT}$ (208) of the substrate 24 and/or active volume $PV_{ACTIVE}$ (210) of the substrate 24 is less than predetermined value(s). The catalyst monitoring module 186 may estimate the temperature $T_{CAT}$ of the substrate 24 and/or the active volume $PV_{ACTIVE}$ using a thermal model and based on engine parameters and/or exhaust temperatures, some of which are described below with respect to equations 3 and 4. Although a thermal model is provided below, other suitable thermal model(s), table(s) and/or equation (s) may be used to estimate the temperature $T_{CAT}$ and/or the active volume $PV_{ACTIVE}$. Also, depending upon the sophistication of the thermal control module 40 and corresponding system, one or more of the parameters used in equations 3 and 4 may not be included in determining the temperature $T_{CAT}$ of the substrate 24.

The catalyst monitoring module 186 may directly determine the temperature of the substrate 24 via a temperature sensor of the substrate 24 and/or estimate the temperature $T_{CAT}$ based on ICE parameters ENGPARS (212) and exhaust system parameters EXHPARS (214). The thermal model may include equations, such as equations 3 and 4, which include example ICE parameters and exhaust system parameters.

$$T_{UFCAT} = f \left\{ \begin{array}{l} F_{Rate}, S_{ENG}, C_{Mass}, C_{IMP}, T_{EXH}, DC, \\ E_{RunTime}, E_{Load}, T_{AMB}, CAM, SPK \end{array} \right\} \quad (3)$$

$$PV_{ACTIVE} = f \left\{ \begin{array}{l} T_{CAT}, F_{Rate}, S_{ENG}, C_{Mass}, C_{IMP}, T_{EXH}, DC, \\ E_{RunTime}, E_{Load}, T_{AMB}, CAM, SPK \end{array} \right\} \quad (4)$$

$F_{Rate}$ is exhaust flow rate through the WHR CC 20, which may be a function of mass air flow and fuel quantity supplied to the cylinders 30. The mass air flow may be determined by a mass air flow sensor, such as the intake air flow sensor 92. $S_{ENG}$ is speed of the ICE 12 (i.e. rotational speed of the crankshaft 46). DC is duty cycle of the ICE 12. $C_{Mass}$ is mass of the substrate 24. $C_{IMP}$ is resistance or impedance of the substrate 24. The values $C_{Mass}$ and $C_{IMP}$ may account for mass, resistance and/or impedance of the fluid in the substrate 24. $E_{RunTime}$ is time that the ICE 12 is activated (ON). $E_{Load}$ is current load on the ICE 12. $T_{EXH}$ may refer to a temperature of the exhaust system 14, and based on one or more of the temperature sensors 104-110. $T_{amb}$ is ambient temperature. CAM is cam phasing of the CIE. SPK is spark timing. The temperature signals and the active catalyst volume signal $PV_{ACTIVE}$ may be based on one or more of the engine system parameters provided in equations 3 and 4 and/or other engine system parameters, such as mass $C_{MASS}$ of the substrate 24.

The first comparison module 188 may generate a first comparison signal $COMP_1$ (216) based on the temperature $T_{CAT}$ and a catalyst light-off temperature $T_{CLO}$ (217) (e.g., 250° C.). The second comparison module 190 may generate a second comparison signal $COMP_2$ (218) based on the active catalyst volume $PV_{ACTIVE}$ and a first predetermined active catalyst volume $PV_{PRED1}$ (220). The predetermined active catalyst volume $PV_{PRED1}$ may be, for example, 30-40% of the volume of the substrate 24. The mode selection module 192 generates a mode signal MODE (222) based on the first and second comparison signals $COMP_1$, $COMP_2$, the engine monitoring signal Engine, the speed of the vehicle $S_{VEH}$ and/or the engine speed $S_{ENG}$.

The thermal control module 40 and/or the mode selection module 192 may proceed to 308 when one or both of the comparison signals $COMP_1$, $COMP_2$ is, for example, LOW, otherwise the thermal control module 40 may proceed to task 311. This indicates that temperature of the substrate 24 is less than the light-off temperature or a predetermined temperature and/or the active volume of the substrate 24 is less than a predetermined volume.

At 308, the catalyst heating system 110 electrically heats the substrate 24. The thermal control module 40 and/or the temperature module 194 generates a power signal POW (224), which may be provided to the power source 62 and/or the switch 112 to control current supplied to the electrodes 100, 102.

At 310, the thermal control module 40 and/or the WHR module 196 restricts and/or prevents the fluid to flow through the WHR circuit 150 including the fluid channels of the substrate 24. The WHR module 196 may generate signals PUMP (226), VALVE (228) to control speed of the WHR pump 56 and/or state of the valve 58. The thermal control module 40 may return to task 202 subsequent to task 310.

At 311, the thermal control module 40 determines whether temperature $T_{CAT}$ of the substrate 24 and/or active volume $PV_{ACTIVE}$ of the substrate 24 is greater than predetermined value(s). The catalyst monitoring module 186 may estimate the temperature $T_{CAT}$ of the substrate 24 and/or the active volume $PV_{ACTIVE}$ using the thermal model of equations 3 and 4 or other suitable thermal model(s), table(s) and/or equation (s). The first comparison module 188 may generate the first comparison signal $COMP_1$ based on the temperature $T_{CAT}$ and a predetermined temperature $T_{PRED}$ (230). The predetermined temperature may be greater than or equal to the light-off temperature $T_{CLO}$. The second comparison module 190 may generate the second comparison signal $COMP_2$ based on the active catalyst volume $PV_{ACTIVE}$ and a second predetermined active catalyst volume $PV_{PRED2}$ (232). The second predetermined active catalyst volume $PV_{PRED2}$ may be greater than or equal to the first predetermined active catalyst volume $PV_{PRED1}$.

The thermal control module 40 and/or the mode selection module 192 may proceed to 312 when one or both of the comparison signals $COMP_1$, $COMP_2$ is, for example, HIGH, otherwise the thermal control module 40 may return to task 302.

In one implementation, task 311 is not performed and task 312 is performed subsequent to task 310. At 312, the thermal control module 40 and/or the temperature module 194 deactivates the catalyst heating system 110. This may include, for example, switching OFF the switch 112 and/or preventing electrical current to be supplied to the electrodes 100, 102.

At 314, the WHR module 196 permits the fluid to circulate through the WHR circuit 150 including the fluid channels of the substrate 24. This fluid flow may not be restricted. The WHR module 196 adjusts the signals PUMP, VALVE to control the flow rate and pressure of the fluid circulating through the WHR circuit 150. The WHR module 196 may adjust the signals to adjust the fluid flow rate and pressure based on the temperature $T_{CAT}$. The thermal control module 40 may return to task 302 subsequent to task 314.

The above-described tasks are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A catalytic converter comprising:
   an inlet end configured to receive an exhaust gas from an engine;
   an outlet end configured to output the exhaust gas;
   a catalyst body disposed between the inlet end and the outlet end, wherein the catalyst body comprises partitioning members,
   a plurality of exhaust channels configured to guide the exhaust gas from the inlet end to the outlet end; and
   a plurality of fluid channels configured to receive a fluid from and return the fluid to a waste heat recovery circuit,
   wherein each of the plurality of exhaust channels and each of the plurality of fluid channels comprises a respective plurality of the partitioning members;
   a manifold comprising a manifold body, wherein the manifold body is connected to the catalyst body and is configured to guide the fluid to and from the plurality of fluid channels; and
   at least one insulator connected between the catalyst body and the manifold body.

2. The catalytic converter of claim 1, wherein at least portions of the partitioning members form walls of the plurality of exhaust channels and the plurality of fluid channels.

3. The catalytic converter of claim 1, wherein the plurality of fluid channels extend from the inlet end to the outlet end and in parallel with the plurality of exhaust channels.

4. The catalytic converter of claim 1, wherein the plurality of fluid channels extend adjacent to and receive thermal energy from the partition members and the plurality of exhaust channels.

5. The catalytic converter of claim 1, wherein:
   the plurality of fluid channels comprises channel pairs; and
   each of the channel pairs comprises a receive channel and a return channel.

6. The catalytic converter of claim 5, wherein the receive channel and the return channel are connected to provide a single channel.

7. The catalytic converter of claim 5, further comprising end plugs, wherein each of the end plugs blocks a respective one of the receive channels and a respective one of the return channels at the inlet end from receiving the exhaust gas.

8. The catalytic converter of claim 1, further comprising end plugs, wherein each of the end plugs blocks at least one of the plurality of fluid channels.

9. The catalytic converter of claim 1, wherein:
   the catalyst body comprises a first honeycomb structure comprising the partitioning members;
   the manifold body comprises a second honeycomb structure; and
   the plurality of exhaust channels and the plurality of fluid channels are in alignment with corresponding channels in the manifold body.

10. The catalytic converter of claim 1, wherein the catalyst body is formed of a different material than the manifold body.

11. The catalytic converter of claim 1, wherein:
    the catalyst body is formed of an electrically conductive material; and
    the manifold body is formed of a non-electrically conductive material.

12. A system comprising:
    the catalytic converter of claim 1; and
    a catalyst heating system supplying electrical current to the catalyst body.

13. The system of claim 12, further comprising a control module configured to:
    supply the electrical current to the catalyst body and restrict flow of the fluid through the waste heat recovery circuit and the plurality of fluid channels when temperature of the catalyst body is less than a light-off temperature of a catalyst of the catalyst body; and
    prevent supply of the electrical current to the catalyst body and to permit flow of the fluid through the waste heat recovery circuit including the plurality of fluid channels when the temperature of the catalyst body is greater than the light-off temperature.

14. A catalytic converter comprising:
an inlet end configured to receive an exhaust gas from an engine;
an outlet end configured to output the exhaust gas;
a catalyst body disposed between the inlet end and the outlet end, wherein the catalyst body comprises partitioning members,
 a plurality of exhaust channels configured to guide the exhaust gas from the inlet end to the outlet end; and
 a first plurality of fluid channels configured to receive a fluid from and return the fluid to a waste heat recovery circuit,
 wherein each of the plurality of exhaust channels and each of the first plurality of fluid channels comprises a respective plurality of the partitioning members;
a manifold comprising a manifold body and a second plurality of fluid channels, wherein the manifold body is connected to the catalyst body and is configured to guide the fluid, via the second plurality of fluid channels, to and from the first plurality of fluid channels; and
a plurality of channel couplers connected between pairs of the first plurality of fluid channels and corresponding pairs of the second plurality of fluid channels, wherein each of the plurality of channel couplers is electrically non-conductive.

15. The catalytic converter of claim 14, further comprising at least one insulator connected between the catalyst body and the manifold body.

16. A catalytic converter comprising:
an inlet end configured to receive an exhaust gas from an engine;
an outlet end configured to output the exhaust gas;
a catalyst body disposed between the inlet end and the outlet end, wherein the catalyst body comprises
 a plurality of exhaust channels configured to guide the exhaust gas from the inlet end to the outlet end, and
 a first plurality of fluid channels configured to receive a fluid from and return the fluid to a waste heat recovery circuit; and
a manifold comprising a second plurality of channels connected to the first plurality of fluid channels, wherein the manifold is upstream or downstream from and connected to the catalyst body, and wherein the manifold is configured to direct the fluid from the waste heat recovery circuit to the first plurality of fluid channels and from the first plurality of fluid channels to the waste heat recovery circuit.

17. The catalytic converter of claim 16, wherein the fluid is a non-conductive fluid.

18. The catalytic converter of claim 16, further comprising a plurality of electrodes connected to the catalyst body to pass current through the catalyst body, wherein the plurality of electrodes comprise:
a first electrode connected to a first side of the catalyst body; and
a second electrode connected to a second side of the catalyst body, wherein the second side is opposite the first side.

19. The catalytic converter of claim 16, further comprising at least one insulator connected between the catalyst body and the manifold.

20. The catalytic converter of claim 16, wherein the exhaust gas passes through the manifold.

* * * * *